United States Patent
Yiu et al.

(10) Patent No.: US 9,496,973 B2
(45) Date of Patent: *Nov. 15, 2016

(54) USER EQUIPMENT AND METHODS FOR HANDOVER ENHANCEMENT USING REFERENCE SIGNAL RECEIVED QUALITY (RSRQ)

(71) Applicant: Intel Corporation, Santa Clara, CA (US)

(72) Inventors: Candy Yiu, Portland, OR (US); Yujian Zhang, Beijing (CN); Mo-Han Fong, Sunnyvale, CA (US); Yuefeng Peng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,150

(22) Filed: Jul. 15, 2015

(65) Prior Publication Data

US 2016/0014662 A1   Jan. 14, 2016

Related U.S. Application Data

(63) Continuation of application No. 13/631,213, filed on Sep. 28, 2012, now Pat. No. 9,130,688.

(60) Provisional application No. 61/646,223, filed on May 11, 2012.

(51) Int. Cl.
*H04J 3/00* (2006.01)
*H04B 7/26* (2006.01)
(Continued)

(52) U.S. Cl.
CPC ............... *H04J 3/1694* (2013.01); *H04B 1/56* (2013.01); *H04B 7/024* (2013.01); *H04B 7/0456* (2013.01);
(Continued)

(58) Field of Classification Search
CPC .. H04B 7/0456; H04B 7/063; H04B 7/0632; H04W 36/00; H04W 36/08; H04W 36/24
See application file for complete search history.

(56) References Cited

U.S. PATENT DOCUMENTS

| 5,697,055 A | 12/1997 | Gilhousen et al. |
| 9,130,688 B2 | 9/2015 | Yiu et al. |

(Continued)

FOREIGN PATENT DOCUMENTS

| JP | 2015520560 A | 7/2015 |
| WO | WO-2011041751 A2 | 4/2011 |

(Continued)

OTHER PUBLICATIONS

"U.S. Appl. No. 13/631,213, Non Final Office Action mailed Jan. 9, 2015", 6 pgs.

(Continued)

*Primary Examiner* — Sujatha Sharma
(74) *Attorney, Agent, or Firm* — Schwegman Lundberg & Woessner, P.A.

(57) ABSTRACT

Embodiments of user equipment (UE) and method for handover enhancement using reference signal received quality (RSRQ) in a wireless network are generally described herein. In some embodiments, a UE adaptively selects handover initiation parameters based, at least in part, on a velocity of the UE. The UE may determine an RSRQ of a serving cell and an RSRQ of a target cell and may transmit a measurement report to a serving eNB for handover from the serving cell to the target cell when the target cell RSRQ exceeds the serving cell RSRQ in accordance with the selected handover initiation parameters. In some of these embodiments, the handover initiation parameters may include an offset value, such as an A3offset value, and a time-to-trigger (TTT) that comprise an A3offset-TTT pair.

13 Claims, 3 Drawing Sheets

(51) Int. Cl.

| | | |
|---|---|---|
| H04B 15/00 | (2006.01) | |
| H04W 36/00 | (2009.01) | |
| H04W 72/04 | (2009.01) | |
| H04W 52/02 | (2009.01) | |
| H04W 76/04 | (2009.01) | |
| H04L 27/26 | (2006.01) | |
| H04L 5/00 | (2006.01) | |
| H04J 3/16 | (2006.01) | |
| H04W 24/10 | (2009.01) | |
| H04W 72/08 | (2009.01) | |
| H04B 1/56 | (2006.01) | |
| H04W 56/00 | (2009.01) | |
| H04W 76/02 | (2009.01) | |
| H04W 4/22 | (2009.01) | |
| H04W 36/22 | (2009.01) | |
| H04B 7/02 | (2006.01) | |
| H04B 7/04 | (2006.01) | |
| H04B 7/06 | (2006.01) | |
| H04W 24/02 | (2009.01) | |
| H04W 72/12 | (2009.01) | |
| H04L 29/02 | (2006.01) | |
| H04W 4/00 | (2009.01) | |
| H04W 4/06 | (2009.01) | |
| H04W 48/20 | (2009.01) | |
| H04W 16/14 | (2009.01) | |
| H04L 29/06 | (2006.01) | |
| H04W 4/02 | (2009.01) | |
| H04J 3/26 | (2006.01) | |
| H04W 72/10 | (2009.01) | |
| H04L 5/14 | (2006.01) | |
| H04W 36/32 | (2009.01) | |
| H04W 4/16 | (2009.01) | |
| H04W 36/04 | (2009.01) | |
| H04W 36/16 | (2009.01) | |
| H04W 72/00 | (2009.01) | |
| H04W 36/30 | (2009.01) | |
| H04W 36/18 | (2009.01) | |
| H04W 88/06 | (2009.01) | |
| H04W 72/02 | (2009.01) | |
| H04L 1/00 | (2006.01) | |
| H04L 1/18 | (2006.01) | |
| H04W 88/02 | (2009.01) | |
| H04W 88/08 | (2009.01) | |

(52) U.S. Cl.
CPC .......... *H04B 7/0473* (2013.01); *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 5/001* (2013.01); *H04L 5/0007* (2013.01); *H04L 5/0035* (2013.01); *H04L 5/0096* (2013.01); *H04L 5/1469* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/16* (2013.01); *H04W 4/22* (2013.01); *H04W 16/14* (2013.01); *H04W 24/02* (2013.01); *H04W 24/10* (2013.01); *H04W 36/00* (2013.01); *H04W 36/0061* (2013.01); *H04W 36/0088* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0212* (2013.01); *H04W 52/0216* (2013.01); *H04W 52/0225* (2013.01); *H04W 52/0229* (2013.01); *H04W 52/0235* (2013.01); *H04W 52/0251* (2013.01); *H04W 56/00* (2013.01); *H04W 56/001* (2013.01); *H04W 72/005* (2013.01); *H04W 72/042* (2013.01); *H04W 72/044* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/12* (2013.01); *H04W 72/1215* (2013.01); *H04W 76/023* (2013.01); *H04W 76/027* (2013.01); *H04W 76/046* (2013.01); *H04W 76/048* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04L 5/14* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | |
|---|---|---|
| 2011/0086635 A1 | 4/2011 | Grob-Lipski |
| 2013/0303231 A1 | 11/2013 | Yiu et al. |
| 2014/0169238 A1 | 6/2014 | Cai et al. |
| 2014/0169284 A1 | 6/2014 | Cai et al. |
| 2014/0171054 A1 | 6/2014 | Cai et al. |
| 2014/0171091 A1 | 6/2014 | Cai et al. |
| 2014/0242969 A1 | 8/2014 | Shimizu et al. |
| 2014/0242989 A1 | 8/2014 | Cai et al. |
| 2014/0254550 A1 | 9/2014 | Salvador et al. |
| 2014/0274049 A1 | 9/2014 | Singh et al. |

FOREIGN PATENT DOCUMENTS

| | | |
|---|---|---|
| WO | WO-2011041753 A2 | 4/2011 |
| WO | WO-2013169904 A1 | 11/2013 |

OTHER PUBLICATIONS

"U.S. Appl. No. 13/631,213, Notice of Allowance mailed May 1, 2015", 8 pgs.

"U.S. Appl. No. 13/631,213, Response filed Apr. 9, 2015 to Non Final Office Action mailed Jan. 9, 2015", 8 pgs.

"Evolved Universal Terrestrial Radio Access (E-UTRA): Physical layer; Measurements", 3GPP TS 36.214—web page listing of all versions in specification, [online]. Retrieved from the Internet: <URL: http://www.3gpp.org/ftp/Specs/html-info/36214.htm>, (Accessed on Oct. 23, 2013), 2 pgs.

"Evolved Universal Terrestrial Radio Access (E-UTRA): Radio Resource Control (RRC); Protocol specification", 3GPP TS 36.331—web page listing of all versions in specification, [online]. Retrieved from the Internet: <URL: http://www.3gpp.org/ftp/Specs/htm-info/36331.htm>, (Accessed on Oct. 23, 2013), 2 pgs.

"International Application Serial No. PCT/US2013/040143, International Preliminary Report on Patentability mailed Nov. 20, 2014", 6 pgs.

"International Application Serial No. PCT/US2013/040143, International Search Report mailed Jul. 29, 2013", 3 pgs.

"International Application Serial No. PCT/US2013/040143, Written Opinion mailed Jul. 29, 2013", 4 pgs.

Ewe, Lutz, et al., "Base station distributed handover optimization in LTE self-organizing networks", 2011 IEEE 22nd International Symposium on Personal Indoor and Mobile Radio Communications (PIMRC), (2011), 243-247.

(56) References Cited

OTHER PUBLICATIONS

"A Non-MSE based Hetnet Mobility Enhancements using RSRQ", Intel Corporation, 3GPP TSG RAN WG2 Meeting #78 R2-122822, (May 15, 2012).
"Discussion on Hetnet Improvements for Mobility", Nokia Siemens Networks, Nokia Corporation, 3GPP TSG-RAN WG2 Meeting #71bis R2-105466, (Oct. 5, 2010).
"European Application Serial No. 13787247.9, Extended European Search Report mailed Dec. 16, 2015", 11 pgs.
"Issues related to UE mobility state estimation in Hetnet", 3GPP TSG-RAN2#76 meeting R2-116273, (Nov. 8, 2011).
"Japanese Application Serial No. 2015-511661, Notice of Reasons for Rejection mailed Dec. 8, 2015", 6 pgs.
Alcatei-Lucent, Shanghai Bell, "Preliminary Studies on Mobility Requirements Impact", 3GPP TSG-RAN WG4 Meeting #AH57 R4-110350, (Jan. 11, 2011).
Alcatei-Lucent, Shanghai Bell, "UE speed-based methods and mobility state estimation for improving the mobility performance in HetNets", 3GPF TSG-RAN WG2 meeting #77 bis R2-121707, (Mar. 20, 2012).
Huawei, Hisilicon, "Way forward on Simulation assumptions of measurement bandwidth impacts on RSRQ", 3GPP TSG-RAN WG4 meeting #62 R4-120071, (Jan. 30, 2012).
U.S. Appl. No. 13/631,213, filed Sep. 28, 2012 User Equipment and Methods for Handover Enhancement Using Reference Signal Received Quality (RSRQ).

| UE SPEED | MACRO TO MACRO | PICO TO MACRO | MACRO TO PICO | PICO TO PICO |
|---|---|---|---|---|
| LOW | OFF_LOW_MM, TTT_LOW_MM | OFF_LOW_PM, TTT_LOW_PM | OFF_LOW_MP, TTT_LOW_MP | OFF_LOW_PP, TTT_LOW_PP |
| MEDIUM | OFF_MED_MM, TTT_MED_MM | OFF_MED_PM, TTT_MED_PM | OFF_MED_MP, TTT_MED_MP | OFF_MED_PP, TTT_MED_PP |
| HIGH | OFF_HIGH_MM, TTT_HIGH_MM | OFF_HIGH_PM, TTT_HIGH_PM | OFF_HIGH_MP, TTT_HIGH_MP | OFF_HIGH_PP, TTT_HIGH_PP |

Fig. 6

USER EQUIPMENT AND METHODS FOR HANDOVER ENHANCEMENT USING REFERENCE SIGNAL RECEIVED QUALITY (RSRQ)

PRIORITY CLAIM

This application is a continuation of U.S. patent application Ser. No. 13/631,213, filed Sep. 28, 2012, now issued as U.S. Pat. No. 9,130,688, which claims priority under 35 USC 119(e) to U.S Provisional Patent Application Ser. No. 61/646,223, filed May 11, 2012, each of which is incorporated herein by reference in its entirety.

TECHNICAL FIELD

Embodiments pertain to wireless cellular communications. Some embodiments relate to heterogeneous network (HetNet) mobility. Some embodiments relate to handover between cells including handover between cells of different cell layers.

BACKGROUND

One issue with cellular communication networks is determining when a mobile device should be handed over between cells (i.e., from a serving cell to a target cell). One of the challenges is performing a handover before the radio link fails. This is particularly an issue in heterogeneous networks (HetNets) where small cells are overlaid by larger cells. Higher-mobility devices have made these handover challenges increasingly difficult.

Thus, there are general needs for improved handover techniques that reduce the radio-link failure rate. There are also general needs for improved handover techniques that increase handover efficiency and operate with less overhead. There are also general needs for improved handover techniques that reduce the radio-link failure rate, particularly for fast moving and higher mobility mobile devices. There are also general needs for improved handover techniques suitable for HetNet mobility.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
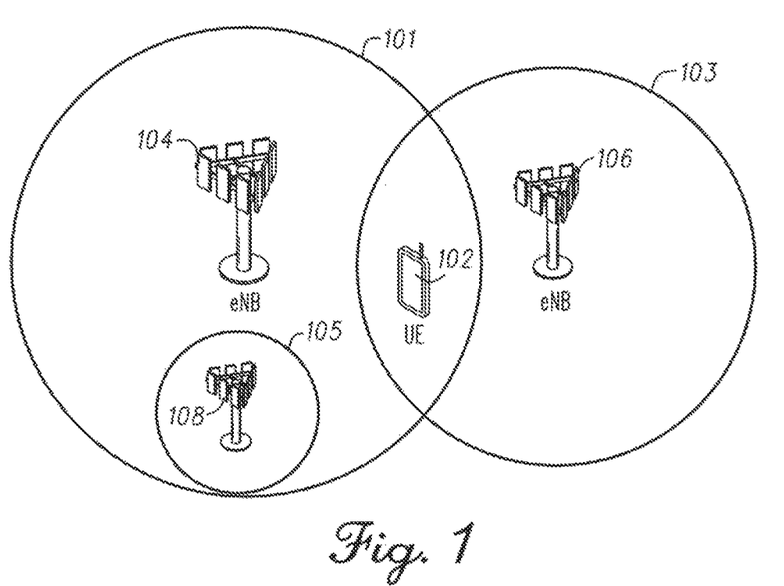
FIG. 1 illustrates cellular communications in accordance with some embodiments.

FIG. 1 illustrates cellular communications in accordance with some embodiments. A base station, such as an enhanced or evolved node B (eNB) 104, provides wireless communication services to communication devices, such as user equipment (UE) 102, within cell 101. A base station, such as eNB 106, provides wireless communication services to communication devices within cell 103. A base station, such as eNB 108, provides wireless communication services to communication devices within cell 105. In this example, eNB 104 may be the serving eNB. A handover may be performed from eNB 104 to another eNB, such as eNB 106 or eNB 108, to handover communications with the UE 102 when certain handover criteria are met.

In accordance with some embodiments, the UE 102 may be configured to adaptively select handover initiation parameters based, at least in part, on the velocity of the UE 102. In these embodiments, the UE 102 may determine a reference signal received quality (RSRQ) of a serving cell (i.e., cell 101) and an RSRQ of a target cell (i.e., cell 103). The UE 102 may transmit a measurement report to serving eNB 104 for handover from the serving cell 101 to the target cell 103 when the target cell RSRQ exceeds the serving cell RSRQ in accordance with the selected handover initiation parameters. In some of these embodiments, the handover initiation parameters may include an offset value, such as an A3 offset value, and a time-to-trigger (TTT). The A3offset value and the TTT may comprise an A3offset-TTT pair.

In these embodiments, the use of the velocity of the UE 102 to select handover initiation parameters, such as an A3offset-TTT pair, and the use of the RSRQ of the target and serving cell 103 and 101 (e.g., instead of reference signal received power (RSRP)) for triggering handover initiation may help reduce the handover failure rate. These embodiments are described in more detail below.

In some embodiments, instead of the velocity or speed of the UE 102, the handover initiation parameters may be selected based on the mobility state of the UE 102. These embodiments are also described in more detail below.

In some embodiments, the handover initiation parameters may be selected based the serving cell type and the target cell type. The serving cell type may comprise either a macro cell or a pico cell and the target cell type may comprise either a macro cell or a pico cell. In the example illustrated in FIG. 1, cells 101 and 103 may be macro cells and eNBs 104 and 106 may be macro eNBs. Cell 105 may be a pico cell and eNB 108 may be a pico eNB. These embodiments are also described in more detail below.

In some embodiments, the handover initiation parameters may be selected based the handover type. The handover type may comprise one of a macro to macro cell handover, a pico to macro cell handover, a macro to pico cell handover or a pico to pico cell handover. These embodiments are also described in more detail below.

In some alternate embodiments, the handover initiation parameters may be selected based on the RSRQ of the target cell 103 and the RSRQ of the serving cell 101. In these alternate embodiments, the UE 102 may select an A3offset value based on target cell RSRQ and may select a TTT based on serving cell RSRQ. In these alternate embodiments, the handover initiation parameters (e.g., the A3offset-TTT pair) may be selected based on the RSRQ of the serving cell 101 and the RSRQ of the target cell 103, rather than on UE velocity and/or handover type. These embodiments are also described in more detail below.

Figure 2:
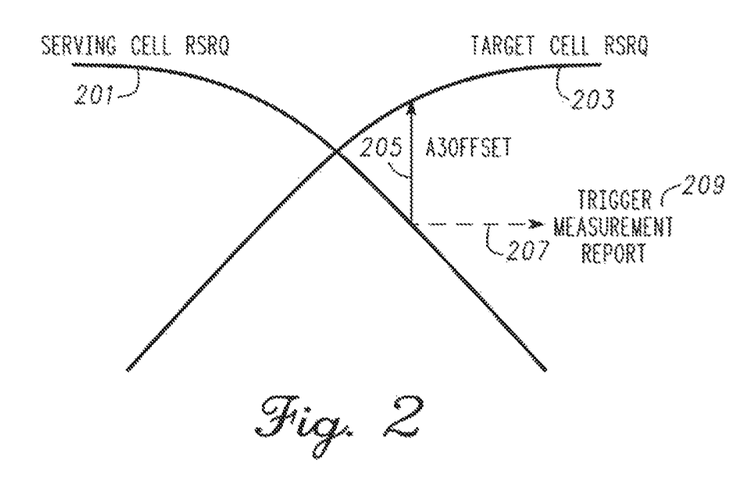
FIG. 2 illustrates an example of handover initiation criterion in accordance with some embodiments.

FIG. 2 illustrates an example of handover initiation criterion in accordance with some embodiments. Serving cell 101 (FIG. 1) may have a serving cell RSRQ 201, and a target cell, such as target cell 103 (FIG. 1) may have a target cell RSRQ 203. In this example illustration, the serving cell RSRQ 201 and the target cell RSRQ 203 may vary as illustrated, which may be the case as a mobile station, such as UE 102 (FIG. 1), moves within the serving cell 101 with respect to the target cell 103. As illustrated in FIG. 2, when the target cell RSRQ 203 continuously exceeds the serving cell RSRQ 201 by at least the A3offset value 205 (i.e., an Event A3 or A3event) for the TTT 207, the UE 102 may transmit a measurement report 209 to the eNB 104 of the serving cell 101. Then the eNB 104 of the serving cell 101 can make a handover decision and send a handover request to the eNB 106 of the target cell 103.

An A3event (or Event A3), as used herein, may be a measurement-reporting event that occurs when a neighbor cell's RSRQ (e.g., target cell RSRQ 203) becomes an amount of offset (i.e., an A3offset value 205) better than the RSRQ of the primary cell (PCell) (e.g., the serving cell RSRQ 201). In some embodiments, an A3 event may refer to an 'Event A3' in accordance with 3GPP T.S. 36.331 ($3^{rd}$ Generation Partnership Project; Technical Specification Group Radio Access Network; Evolved Universal Terrestrial Radio Access (E-UTRA); Radio Resource Control (RRC); Protocol specification (Release 11)) although this is not a requirement. In these embodiments, the Event A3 triggers the measurement report 209 when the A3offset 205 and TTT 207 requirements are met.

In some embodiments, a set of A3offset values and TTTs along with one or more thresholds may be sent by the eNB 104 to the UE 102 at radio-resource control (RRC) connection establishment (e.g., initial connection establishment). When the UE 102 enters an A3event (i.e., the A3offset condition holds), the UE 102 may lock in the selected A3offset value-TTT pair until the TTT time. After expiration of the A3event, the UE 102 may unlock the selected A3offset value-TTT pair when the UE 102 exits the A3event. In these embodiments, when outside of an A3event, the UE 102 may dynamically select an A3offset value-TTT pair based on velocity or mobility state.

In some embodiments, the UE 102 may refrain from selecting or reselecting an A3offset value 205 and TTT 207. When the target cell RSRQ 203 exceeds the serving cell RSRQ 201 by a currently selected A3offset value 205, the UE 102 enter A3event and send the measurement report 209 to serving cell 101. The selection and reselection of an A3offset value 205 and TTT 207 of an A3offset-TTT pair may be performed on a regular basis outside of an A3event, and the selected A3offset value 205 and the TTT 207 are held (i.e., not reselected) during an A3event.

Figure 3:
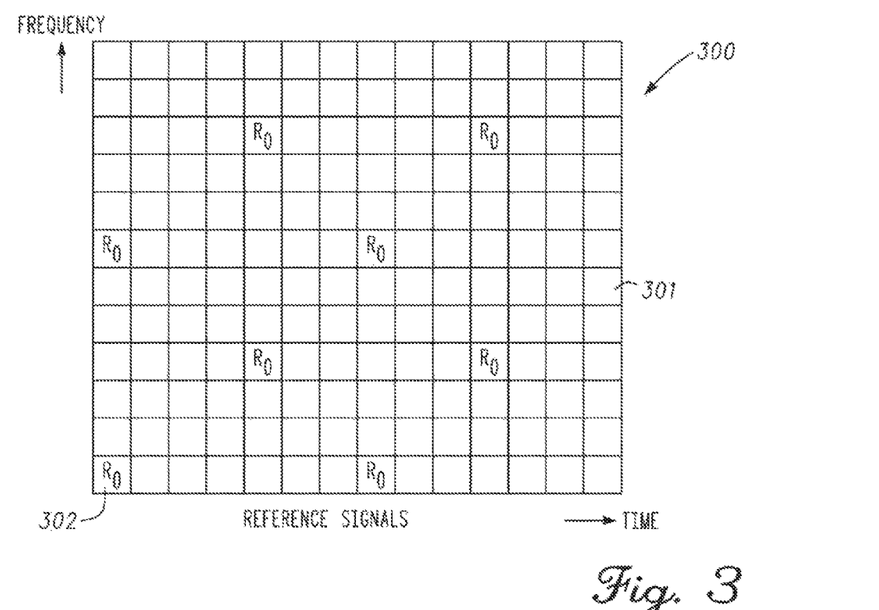
FIG. 3 illustrates reference signal locations in accordance with some embodiments.

FIG. 3 illustrates reference signal locations in accordance with some embodiments. Reference signals 302 (illustrated as $R_0$) are shown at various locations within a resource block 300. Each resource block (RB) 300 may comprise resource elements 301 which may comprise a number of symbols in time and a number of subcarriers in frequency. In some embodiments, the RSRQ of reference signals 302 may be determined from a ratio of a RSRP to a received signal strength indicator (RSSI) for the RBs containing reference signals 302. The RSRP may be measured based on the average signal power level of all the reference signals 302 of a resource block 300.

In some embodiments, the RSRQ of a serving cell 201 and the RSRQ of a target cell 203 are determined in accordance with a 3GPP standard for E-UTRAN LTE (e.g., TS 36.214). The RSRQ of the serving cell 201 and the RSRQ of the target cell 203 may be used to determine an entering condition and a leaving condition for an Event A3 for handover initiation. These embodiments are described in more detail below.

In some embodiments, for greater UE velocities, a smaller A3offset value 205 and a shorter TTT 207 are selected. For lesser UE velocities, a greater A3offset value 205 and a longer TTT 207 are selected. In these embodiments, the A3offset value 205 and TTT 207 may be inversely related to the velocity or mobility state of the UE 102.

In some embodiments, the velocity of the UE 102 may be based on a mobility state of the UE 102 and may be determined from a number of cell reselections during a predetermined time period, although the scope of the embodiments is not limited in is this respect as other mobility-state estimation techniques may be used. In these embodiments, based on the number of cell reselections, the UE 102 may enter a high mobility state, a medium mobility state or a low mobility state. In these embodiments, the mobility state (high, medium and low) may be determined by counting cell reselections. The UE 102 may count cell reselections in idle mode or may count handovers in connected mode. In some embodiments, if the number of cell reselections during the time period $T_{CRmax}$ exceeds $N_{CR\_M}$ and not exceeds $N_{CR\_H}$, the UE 102 may be in the medium-mobility state. If the number of cell reselections during the time period $T_{CRmax}$ exceeds $N_{CR\_H}$, the UE 102 may be in the high-mobility state, otherwise, the UE 102 may be in the low-mobility state. In these embodiments, a different A3offset-TTT pair may be selected by the UE 102 for each mobility state of the UE 102, although the scope of the embodiments is not limited in this respect. In some embodiments, the A3offset-TTT pair may be selected based on the number of cell reselections during a predetermined time period (rather than the mobility state). In some embodiments that use the number cell reselections to determine either velocity or mobility state, consecutive reselections between the same two cells are not counted.

In some other embodiments, the velocity of the UE 102 may be determined from changes in position or location estimates determined from signals transmitted from one or more eNBs including the target eNB 106 and the serving eNB 104. In these embodiments, a timing advance may be used to find the UE's distance from one or more eNBs including the serving eNB 104. In some embodiments, neighbor cell measurements may be used to increase the accuracy. In some embodiments, the UE's location may be trilaterated with the knowledge of three or more eNB's using an Observed Time Difference of Arrival (OTDOA) technique. In these embodiments, timing of the cells in the network and their geographical locations may be transmitted and the time difference of at least two other cells vs. serving cell at the UE 102 may be received. In some other embodiments, the velocity of the UE 102 may be determined from Doppler frequencies of signals received from one or more eNBs.

In some other embodiments, the velocity of the UE 102 may be determined using an assisted satellite positioning (e.g., A-GPS) technique. The A-GPS technique may use signals from satellites including global-positioning system (GPS) signals. In these embodiments, the UE 102 may have a GPS receiver for receiving the GPS signals from GPS satellites and for determining the velocity of the UE, although this is not a requirement as other techniques for velocity determination may be used.

In some embodiments, for a velocity below a predetermined low value, the UE 102 may select a first A3offset-TTT pair (e.g., off_low, ttt_low) from the plurality of A3offset-TTT pairs. For a velocity greater than or equal to the predetermined low value and less than or equal to a predetermined high value, the UE 102 may select a second A3offset-TTT pair (e.g., off_med, ttt_med) from the plurality of A3offset-TTT pairs. For a velocity above the predetermined high value, the UE 102 may select a third A3 offset-TTT pair (e.g., off_high, ttt_high) from the plurality of A3offset-TTT pairs. In an example embodiment, the predetermined low value for velocity may be about 4 km/h and the predetermined high value may be about 60 km/h, although the scope of the embodiments is not limited in this respect. In these example embodiments, the first A3offset-TTT pair may be selected for UE velocities below about 4 km/h, the second A3offset-TTT pair may be selected for UE velocities from about 4 km/h to about 60 km/h, and the third A3offset-TTT pair may be selected for UE velocities greater than about 60 km/h, although the scope of the embodiments is not limited in this respect.

In other example embodiment, the number of cell reselections may be used instead of velocity values (e.g., km/h) for selection of an A3offset-TTT pair. In some embodiments, the velocity may be determined by the number of cell reselections and cell sizes.

Figure 4:
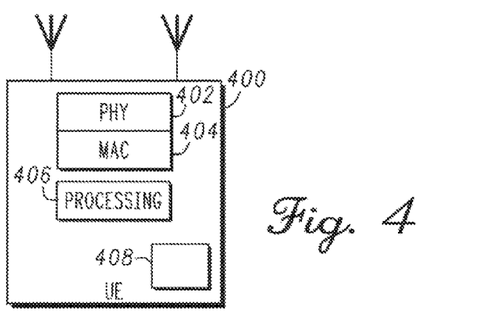
FIG. 4 is a block diagram of user equipment (UE) in accordance with some embodiments.

FIG. 4 is a block diagram of a UE in accordance with some embodiments. UE 400 may be suitable for use as UE 102 (FIG. 1) although other configurations may also be suitable. The UE 400 may include physical-layer (PHY) layer circuitry 402 for communicating with an eNB through one or more antennas. The UE 400 may also include media-access control (MAC) layer circuitry 404 as well as processing circuitry 406 and memory 408.

In accordance with some embodiments, the processing circuitry 406 may be configured to select the handover initiation parameters from a plurality of handover initiation parameters based at least on the velocity or mobility state of the UE 400. The processing circuitry 406 may be configured to determine the RSRQ of the serving cell 201 and the RSRQ of the target cell 203 and the PHY layer circuitry 402 may be configured to transmit the measurement report 209 to the serving eNB 104 for handover initiation from the serving cell 101 to the target cell 103 when the target cell RSRQ 203 exceeds the serving cell RSRQ 201 in accordance with the selected handover initiation parameters. The plurality of A3offset-TTT pairs may be stored in memory 408 of the UE 400.

In some embodiments, the UE 400 may include one or more of a keyboard, a display, a non-volatile memory port, multiple antennas, a graphics processor, an application processor, speakers, and other mobile device elements. The display may comprise an LCD screen including a touch screen. The one or more antennas utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 400 may be configured with the instructions to perform the operations described herein.

In some embodiments, the processing circuitry 406 may include one or more processors and the physical layer circuitry 402 may include radio-frequency (RF) circuitry and baseband circuitry. The RF circuitry may include both receiver and transmitter circuitry. The receiver circuitry may convert received RF signals to baseband signals, and the baseband circuitry may convert the baseband signals to one or more bit streams. The transmitter circuitry may convert one or more bit streams to baseband signal and convert the baseband signals to RF signals for transmission.

In some embodiments, the UE 400 may be configured to receive orthogonal frequency division multiplexed (OFDM) communication signals over a multicarrier communication channel in accordance with an orthogonal frequency division multiple access (OFDMA) communication technique. The OFDM signals may comprise a plurality of orthogonal subcarriers. In some broadband multicarrier embodiments, eNBs (such as eNBs 104, 106 and 108 (FIG. 1) may be part of a broadband wireless access (BWA) network, such as a 3rd Generation Partnership Project (3GPP) Universal Terrestrial Radio Access Network (UTRAN) Long-Term-Evolution (LTE) or a Long-Term-Evolution (LTE) communication network, although the scope of the embodiments is not limited in this respect. In these broadband multicarrier embodiments, the UE 400 and the eNBs may be configured to communicate in accordance with an OFDMA technique for 3GPP-LTE. The OFDMA technique may be either a frequency domain duplexing (FDD) technique that uses different uplink and downlink spectrums or a time-domain duplexing (TDD) technique that uses the same spectrum for uplink and downlink.

In some LTE embodiments, the basic unit of the wireless resource is the Physical Resource Block (PRB), such as resource block 300 (FIG. 3). The PRB may comprise 12 sub-carriers in the frequency domain×0.5 milliseconds (ms) in the time domain. The PRBs may be allocated in pairs (in the time domain). In these embodiments, the PRBs may comprise a plurality of resource elements (REs), such as REs 301 (FIG. 3). A RE may comprise one sub-carrier×one symbol, although this is not a requirement.

In some embodiments, an eNB may transmit channel state information reference signals (CIS-RS) and/or a common reference signal (CRS). These reference signals 302 may be transmitted in predetermined PRBs and may be used to determine an RSRP which may be used to calculate an RSRQ as described herein. In some other embodiments, other downlink reference signals may be used.

In some embodiments, the UE 400 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE 400 and reported to the eNB. In some embodiments, the UE 400 may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE 400 may report a wideband CQI value which refers to the channel quality of the system bandwidth. The UE 400 may also report a sub-band CQI value per sub-band of a certain number of resource blocks 300 which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks 300 that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE 400 in which two or more cooperating/coordinating points, such as remote-radio heads (RRHs), transmit jointly. In these embodiments, the joint transmissions may be MIMO transmissions and the cooperating points are configured to perform joint beamforming.

As mentioned above, in some embodiments, the handover initiation parameters may be selected based the serving cell type and the target cell type. The serving cell type may comprise either a macro cell or a pico cell and the target cell type may comprise either a macro cell or a pico cell. In these embodiments, the use of the serving and target cell type to further select an A3offset-TTT pair and the use of the RSRQ of the target and serving cell (instead of RSRP) for triggering handover initiation may help reduce the handover failure rate.

In these embodiments, a macro to macro handover comprises a handover from a macro serving cell to a macro target cell, a pico to macro handover comprises a handover from a pico serving cell to a macro target cell, a macro to pico handover comprises a handover from a macro serving cell to a pico target cell, and a pico to pico handover comprises a handover from a pico serving cell to a pico target cell. In some embodiments, a pico cell may be considered micro, pico or femto cell and may reside within a macro cell (as illustrated in FIG. 1). In these embodiments, the handover type may comprise one of a macro to macro handover, a pico to macro handover, a macro to pico handover; and a pico to pico handover.

Figure 5:
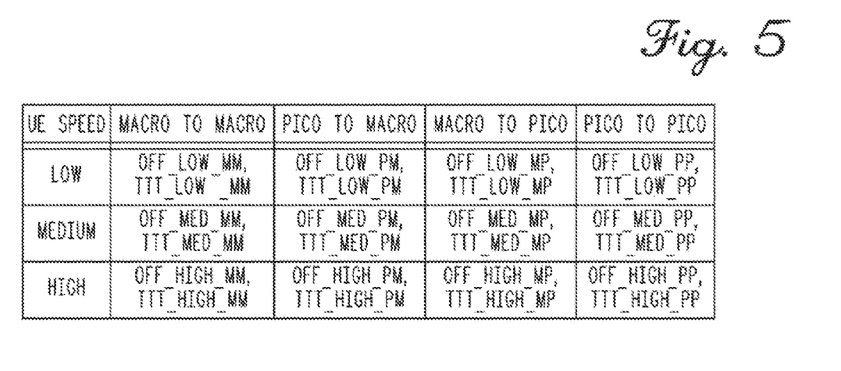
FIG. 5 is a table suitable for use in handover parameter selection in accordance with some embodiments.

In some of these embodiments, the A3offset-TTT pair may be selected from a table, such as the table of FIG. 5, based on the velocity of the UE 400 and the handover type. The table may be stored in memory 408 of the UE 400.

In some of these embodiments, the UE 102 may determine at least one of the serving cell type and the target cell type based on cell or eNB identification information transmitted by the eNB 104 of the serving cell 101 and/or the eNB (eNB 106 or eNB 108) of the target cell (cell 103 or cell 105) indicating whether a cell is a macro cell or a pico cell. In some embodiments, cell or eNB identification information indicating whether the cell is a macro cell or a pico cell may be carried on a broadcast channel, such as the physical broadcast channel (PBCH) or the physical downlink shared channel (PDSCH) in an LTE network, although this is not a requirement.

In some embodiments, the UE 102 may determine at least one of the serving cell type and the target cell type based on measured signal strength of reference signals 302 transmitted by the eNB of the serving cell 101 and/or the eNB of the target cell 103 or 105. In these embodiments, the signal strength of reference signals 302 transmitted by an eNB of a macro cell (i.e., a macro eNB) may be significantly greater than the signal strength of reference signals 302 transmitted by an eNB of a pico cell (i.e., a pico eNB) allowing the UE 102 to determine the cell type regardless of whether the UE 102 is near a cell center or cell edge. In some embodiments, the eNB of the serving cell 101 and/or the eNB of the target cell 103 or 105 may transmit an indicator of signal strength which may be used to determine the cell type.

In some embodiments, for a handover from a pico serving cell to a macro target cell, a smaller A3offset value and a smaller TTT are selected (than if selected based on velocity alone). For a handover from a macro serving cell to a pico target cell, a larger A3offset value 205 and a smaller TTT 207 are selected (than if selected based on velocity alone). In some of these embodiments, after initial selection of A3offset-TTT pair based on UE velocity, an A3offset-TTT pair with a smaller A3offset value 205 and a smaller TTT 207 may be selected for a handover from a pico serving cell to a macro target cell. After initial selection of A3offset-TTT pair based on UE 102 velocity, an A3offset-TTT pair with a larger A3offset value 205 and a smaller TTT 207 may be selected for a handover from a macro serving cell to a pico target cell. In some embodiments, the A3offset value 205 and the TTT 207 may be increased or decreased based on the handover type.

In some embodiments, for handovers between cells of the same type (i.e., a macro to macro handover or a pico to pico handover), the initially selected values for the A3offset-TTT pair based on velocity may be used, although this is not a requirement. In other embodiments, for handovers between cells of the same type, values other than the initially selected values for the A3offset-TTT pair based on velocity may be used, such as those illustrated in FIG. 5.

In some embodiments, the A3offset-TTT pair may be selected from the plurality of A3 offset-TTT pairs based on at least one of a size of the serving cell and a size of the target cell (e.g., rather than cell type). For a handover from a smaller serving cell to a larger target cell, a smaller A3offset value 205 and a smaller TTT 207 may be selected. For a handover from a larger serving cell to a smaller target cell, a larger A3offset value 205 and a smaller TTT 207 is selected.

Figure 6:
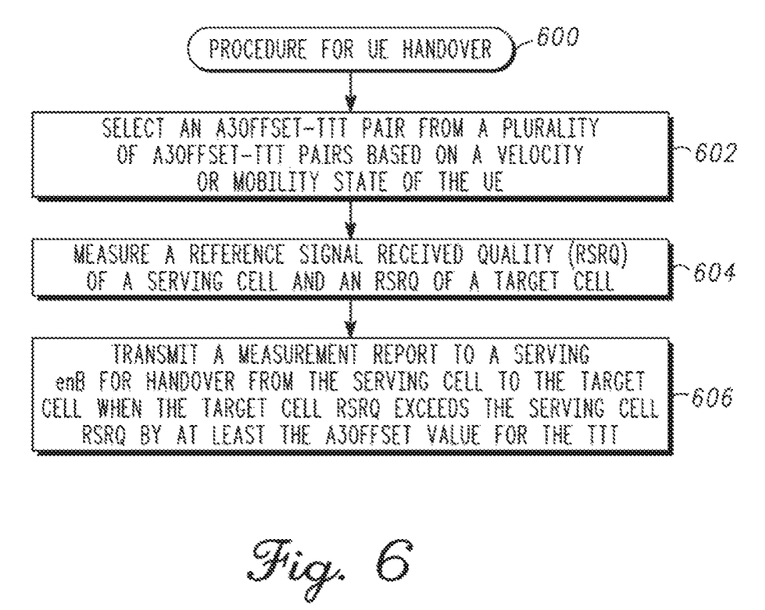
FIG. 6 is a flow chart of a procedure for UE handover in accordance with some embodiments.

FIG. 6 is a flow chart of a procedure for UE handover in accordance with some embodiments. Procedure 600 may be performed by a UE, such as UE 102 (FIG. 1).

In operation 602, the UE 102 may select an A3offset-TTT pair from a plurality of A3offset-TTT pairs based on a velocity or mobility state of the UE 102. Prior to operation 602, the UE 102 may determine its velocity or mobility state as discussed above.

In operation 604, the UE 102 may determine a RSRQ of a serving cell 101 and an RSRQ of a target cell 103 or 105.

In operation 606, the UE 102 may generate and transmit a measurement report 209 to a serving eNB (e.g., eNB 104) for handover from the serving cell 101 to the target cell 103 or 105 when the target cell RSRQ 203 exceeds the serving cell RSRQ 201 by at least the A3offset value 205 for the TTT 207.

As mentioned above, in some alternate embodiments, the handover initiation parameters may be selected based on the RSRQ of the target cell 203 and the serving cell (rather than on UE velocity and/or handover type). In these alternate embodiments, the UE 102 may select an A3offset value 205 based on target cell RSRQ 203 and may select a TTT 207 based on serving cell RSRQ 201. In these alternate embodiments, selecting the A3offset value 205 may comprise selecting one of a plurality of A3offset values 205 based on the target cell RSRQ 203 and one or more RSRQ thresholds. Selecting a TTT 207 may comprise selecting one of a plurality of TTTs based on the serving cell RSRQ 201 and the one or more RSRQ thresholds.

In these embodiments, a handover from the serving cell 101 (FIG. 1) to the target cell 103 (FIG. 1) may be initiated when the target cell RSRQ 203 continuously exceeds the serving cell RSRQ 201 by at least the selected A3offset value 205 for the selected TTT 207. In some embodiments, the A3offset value 205 may be selected to be inversely related to the target cell RSRQ 203 and the TTT 207 may be selected to be directly related to the serving cell RSRQ 201.

In some embodiments, selecting an A3 offset value 205 may comprise selecting one of a plurality of A3offset values (i.e., v1, v2 or v3) based on the target cell RSRQ 203. Selecting a TTT 207 may comprise selecting one of a plurality of TTTs (t1, t2 or t3) based on the serving cell RSRQ 201. In these embodiments, a greater A3offset value 205 may be selected for a lower target cell RSRQ 203, and a lesser A3offset value 205 may be selected for a higher target cell RSRQ 203. In these embodiments, the selected A3offset value 205 is inversely proportional or related to the target cell RSRQ 203. The A3offset value 205 may be in dB although the scope of the embodiments is not limited in this respect.

In some embodiments, the difference between the target cell RSRQ 203 and serving cell RSRQ 201 (e.g., the measured serving cell RSRQ 201 subtracted from the measured target cell RSRQ 203) may be referred to as a measured A3offset. An A3event may occur when the measured A3offset exceeds to the selected A3offset value 205.

In some embodiments, a greater TTT 207 may be selected for a higher serving cell RSRQ 201 and a lesser TTT 207 may be selected for a lower serving cell RSRQ 201. In these embodiments, the selected TTT 207 may be directly related or linearly proportional to the serving cell RSRQ 201. The TTT 207 may be in milliseconds although the scope of the embodiments is not limited in this respect.

In some embodiments, the plurality of A3offset values and the plurality of TTTs may be received from the eNB 104 at an RRC connection establishment. In some embodiments, the plurality of A3offset values and the plurality of TTTs may be based on a default or initial A3offset value 205 and TTT 207. In some embodiments, the A3offset values 205 and the TTTs may be configured or determined by the eNB 104 at the RRC connection establishment between the eNB 104 and the UE 102, although this is not a requirement. In some embodiments, the A3offset values and the TTTs may be predetermined. The A3offset values and the TTTs may be stored in the UE 102 for later selection as described above.

In some alternate embodiments, the plurality of A3offset values and the plurality of TTTs may be generated by the UE 102 based on a default or initial A3offset value 205 and TTT 207. In these alternate embodiments, the default or initial A3offset value 205 and TTT 207 may be provided by the eNB 104, although this is not a requirement.

In some embodiments, a first A3offset value (v1) may be selected for the A3offset value 205 when the target cell RSRQ 203 is greater than a RSRQ threshold ($\alpha$), and a second A3offset value (v2) may be selected for the A3offset value 205 when the target cell RSRQ 203 is not greater than the RSRQ threshold ($\alpha$). In these embodiments, a first TTT (t1) may be selected for the TTT 207 when the serving cell RSRQ 201 is greater than the RSRQ threshold ($\alpha$), and a second TTT (t2) may be selected for the TTT 207 when the serving cell RSRQ 201 is not greater than the RSRQ threshold ($\alpha$). The first A3offset value (v1) may be less than the second A3offset value (v2), and the first TTT (t1) may be greater than the second TTT (t2). In some of these embodiments, the first A3offset value (v1), the second A3offset value (v2), the first TTT (t1), the second TTT (t2) and the RSRQ threshold ($\alpha$) may be provided by the eNB 104 at a connection establishment.

In some embodiments, the target cell RSRQ 203 and the serving cell RSRQ 201 may be divided into a plurality of levels (N) in which N−1 RSRQ thresholds are used to select from N A3offset values and N TTTs. In an example embodiment in which three levels are used (N=3), a first A3 offset value (v1) may be selected for the A3 offset value 205 when the target cell RSRQ 203 is greater than a first RSRQ threshold ($\alpha$), a second A3offset value (v2) may be selected for the A3offset value 205 when the target cell RSRQ 203 is greater than a second RSRQ threshold ($\beta$) but is not greater than the first RSRQ threshold ($\alpha$), and a third A3offset value (v3) may be selected for the A3offset value 205 when the target cell RSRQ 203 is not greater than the second RSRQ threshold ($\beta$). A first TTT (t1) may be selected for the TTT 207 when the serving cell RSRQ 201 is greater than the RSRQ threshold ($\alpha$), a second TTT (t2) may be selected for the TTT 207 when the serving cell RSRQ 201 is greater than a second RSRQ threshold ($\beta$) but is not greater than the first RSRQ threshold ($\alpha$), and a third TTT (t3) may be selected for the TTT 207 when the serving cell RSRQ 201 is not greater than the second RSRQ threshold (β). The first A3 offset value (v1) may be less than the second A3offset value (v2), which may be less than the third A3offset value (v3) (i.e., v1<v2<v3). The first TTT (t1) may be greater than the second TTT (t2), which may be greater than the third TTT (t3) (i.e., t1>t2>t3). In these embodiments, the first, second and third A3offset values, the first, second and third TTTs, and the first and second RSRQ thresholds may be provided by the eNB 104 at a connection establishment.

In these embodiments, the first RSRQ threshold (α) may be greater than the second RSRQ threshold (β) by up to three dB or more, although the scope of the embodiments is not limited in this respect. In some embodiments, N may be greater or equal to two and less than five although the scope of the embodiments is not limited in this respect as N may be greater than five. In some embodiments, the RSRQ threshold(s) (α, β) may be determined by the system based on simulations performed for a UE 102 moving at different speeds to minimize or reduce radio link failure and reduce handover overhead.

In an example embodiment for N=2, a single RSRQ threshold and two different A3offset values and two different TTTs may be provided by the eNB 104. For N=3, two RSRQ thresholds, three different A3offset values and three different TTTs may be provided. For N=4, three RSRQ thresholds, four different A3offset value and four different TTTs may be provided. In these embodiments, the UE 102 may select an A3offset-TTT pair based on measured target and service cell RSRQs and the RSRQ threshold(s) for handover initiation.

In some embodiments, the UE 102 may send or transmit a measurement report 209 (FIG. 2) to the serving eNB 104 when the target cell RSRQ 203 has continuously exceeded the serving cell RSRQ 201 by at least the selected A3offset value 205 for the selected TTT 207 for use by the eNB 104 of the serving cell 101 for potential handover decision. The measurement report 209 may include at least a cell identifier of the target cell 103. A handover may be performed in response to the measurement report 209.

In some embodiments, the measurement report 209 may include the serving cell RSRQ 201 and the target cell RSRQ 203 that was measured at expiration of the TTT timer. The measurement report 209 may also include the RSRQ of other neighbor cells. In some embodiments, the measurement report 209 may be referred to as a trigger measurement report. In some of these embodiments, the neighbor cell with the greatest/strongest RSRQ may be identified as the target cell 103. The measurement report 209 may identify a cell by its physical cell identifier (physcellid) and in some embodiments; a closed subscriber group (CSG) identity of the cell may be included. In some alternate embodiments, the measurement report 209 may be used to trigger a handover to the target cell 103 and may not necessarily include RSRQ values.

In some alternate embodiments, the A3offset-TTT pair is selected based on the RSRQ of the serving cell 201 and the RSRP of the target cell, rather than the RSRQ of both the serving cell and the target cell. The measurement report 209 may be transmitted to an eNB for handover from a serving cell to a target cell when the target cell RSRQ 203 exceeds a serving cell RSRQ 201 by at least the A3offset value 205 for the TTT 207. The RSRQ may be determined from a ratio of an RSRP to a RSSI for resource blocks 300 containing reference signals 302. In these embodiments, the A3 offset value 205 may be selected from a plurality of A3offset values based on the target cell RSRP and one or more RSRP thresholds (e.g., ($α_1$, $β_1$). The TTT 207 may be selected from one of a plurality of TTTs based on the serving cell RSRQ 201 and the one or more RSRQ thresholds (e.g., ($α_2$, $β_2$)).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for User Equipment (UE) configured for speed-dependent cell reselection, the apparatus comprising:
    processing circuitry to select a threshold for handover based on a mobility state of the UE and to determine a reference signal received quality (RSRQ) of a serving cell and an RSRQ of a target cell from a ratio of a reference signal received power (RSRP) to a received signal strength indicator (RSSI) for resource blocks (RBs) containing reference signals; and
    physical layer circuitry to transmit a measurement report to a serving eNB for handover from the serving cell to the target cell based on the selected threshold when the target cell RSRQ exceeds the serving cell RSRQ by at least an A3offset value for a time-to-trigger (TTT).

2. The apparatus of claim 1 wherein to select a threshold for handover, the processing circuitry is to select the TTT based on the mobility state, wherein a first TTT is associated with detection of a high-mobility state, and a second TTT is associated with detection of a medium-mobility state.

3. The apparatus of claim 2 wherein the ITT is inversely proportional to the mobility state detected.

4. The apparatus of claim 3 wherein the mobility state of the UE is determined at least in part from a number of cell reselections during a predetermined time period.

5. The apparatus of claim 1 wherein to select a threshold for handover, the processing circuitry is to select an A3offset-TTT pair based on the mobility state of the UE, the A3offset-TTT pair comprising an A3offset value and a TTT, and
    wherein the measurement report is transmitted when the target cell RSRQ exceeds the serving cell RSRQ by at least the A3offset value for the TTT.

6. The UE of claim 5 wherein the RSRP is determined from one or more of channel state information reference signals (CIS-RS) and common reference signals (CRS) that are transmitted by an eNB in predetermined physical resource blocks (PRBs).

7. The apparatus of claim 6 wherein the processing circuitry is further arranged to select the A3offset-TTT pair based further on one or more of a serving cell type and a target cell type, the serving cell type comprising either a macro cell or a pico cell, the target cell type comprising either a macro cell or a pico cell.

8. The apparatus of claim 3 wherein the processing circuitry is further configured to:
    cause the UE to enter the high-mobility state when criteria for the high-mobility state are detected;
    cause the UE to enter the medium-mobility state when criteria for the medium-mobility state are detected; and
    select a different threshold for handover when the UE is in the high-mobility state than when the UE is in the medium-mobility state.

9. The apparatus of claim 8 wherein the UE is configured to:
    receive parameters in a system information broadcast including handover thresholds;

apply the handover thresholds to a number of cell reselections occurring within a cell reselection time period to detect when the UE is in the high-mobility state or the medium-mobility state.

10. The apparatus of claim 9 wherein the received parameters are used to determine the criteria for the high-mobility state and the criteria for the medium-mobility state.

11. The apparatus of claim 9 wherein the processing circuitry is further configured to:
   scale the received parameters based on the mobility state of the UE; and
   apply the scaled parameters to reference signals of a serving cell and one or more target cells.

12. A non-transitory computer-readable storage medium that stores instructions for execution by one or more processors of a User Equipment (UE) to configure the UE to perform operations to:
   select a threshold for handover based on a mobility state of the UE;
   determine a reference signal received quality (RSRQ) of a serving cell and an RSRQ of a target cell from a ratio of a reference signal received power (RSRP) to a received signal strength indicator (RSSI) for resource blocks (RBs) containing reference signals; and
   encode a measurement report for transmission to a serving eNB for handover from the serving cell to the target cell based on the selected threshold when the target cell RSRQ exceeds the serving cell RSRQ by at least an A3offset value for a time-to-trigger (TTT).

13. The non-transitory computer-readable storage medium of claim 12 wherein to select a threshold for handover, the TTT is selected based on the mobility state, wherein a first TTT is associated with detection of a high-mobility state, and a second TTT is associated with detection of a medium-mobility state.

\* \* \* \* \*